Figure 1:
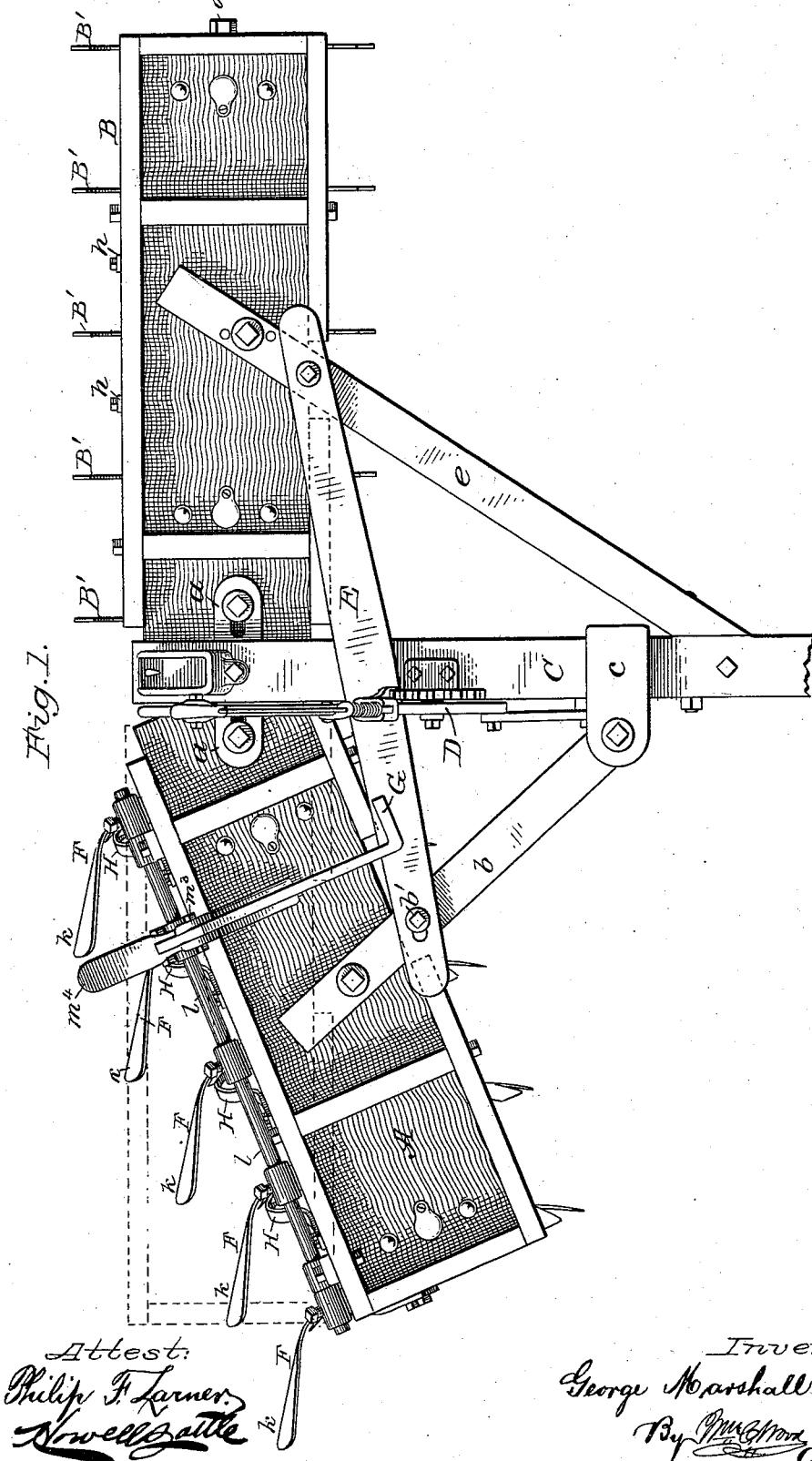

(No Model.) 3 Sheets—Sheet 1.

G. M. CLARK.
LAND PLOWING MACHINE.

No. 478,311. Patented July 5, 1892.

Attest:
Philip F. Larner
Nowell Battle

Inventor:
George Marshall Clark
By [signature]
Attorney (No Model.) 3 Sheets—Sheet 3.

G. M. CLARK.
LAND PLOWING MACHINE.

No. 478,311. Patented July 5, 1892.

Attest:
Philip F. Larner
Howell Bartle

Inventor:
George Marshall Clark.
By Wm C Wood
Attorney

UNITED STATES PATENT OFFICE.

GEORGE MARSHALL CLARK, OF HADDAM, CONNECTICUT, ASSIGNOR TO CLEMENT S. HUBBARD, OF SAME PLACE.

LAND-PLOWING MACHINE.

SPECIFICATION forming part of Letters Patent No. 478,311, dated July 5, 1892.

Application filed April 5, 1892. Serial No. 427,868. (No model.)

*To all whom it may concern:*

Be it known that I, GEORGE MARSHALL CLARK, of Haddam, county of Middlesex, and State of Connecticut, have invented certain new and useful Improvements in Land-Plowing Machines; and I do hereby declare that the following specification, taken in connection with the drawings furnished and forming a part of the same, is a clear, true, and complete description of my invention.

My said improvements pertain to machines embodying rotary plowshares and adapted to perform actual plowing duty, as distinguished from the mere working of plowed soil, as by rotary disk harrows; and said improvements have been devised for and applied to machines embodying more or less of the features of invention disclosed in my Letters Patent No. 466,772, dated January 12, 1892, and still other features disclosed in my application, filed December 9, 1891, Serial No. 414,487.

One characteristic feature of my machines as heretofore devised resides in rotary plowshares angularly mounted with reference to the line of draft, and adapted not only to cut deeply into the soil, but also to lift the soil in mass edgewise and enable it to be turned over, broken up, and leveled by means of co-operating mold-boards located at the rear of and projecting laterally from the rear edge of the plowshare. In my prior machines I have employed mold-boards which were stationary, and others which while capable of being stationary, during their operation were nevertheless capable of having imparted thereto a to-and-fro movement horizontally. In some of my said prior machines the plowshares have followed in paths cut by landside-disks, and in others the plowshares have been wholly located at one side of the line of draft, and offset by landside-disks located at the other side of said line.

A characteristic feature of machines embodying my present improvements resides in such a construction and organization of the mold-boards that they may yield bodily under circumstances rendering that capacity desirable; also so that said mold-boards may be held quite rigidly to their work, as when a specially heavy furrow is being turned in soils free from masses of obstructive matter; also so that the mold-boards may be caused to operate at different horizontal planes above the bottom of the furrows cut by the shares; and still further, so that the mold-boards can be put out of service at the will of the operator, as in working deeply through specially soft wet land, or when there is an undue quantity of roots, weeds, and other trash encumbering the mold-boards, and which may be disengaged during lifting and lowering movements.

After describing my improvements as applied to the machine illustrated in the drawings, the features referred to and others deemed novel will be specified in the several clauses of claim hereunto annexed.

Figure 2:
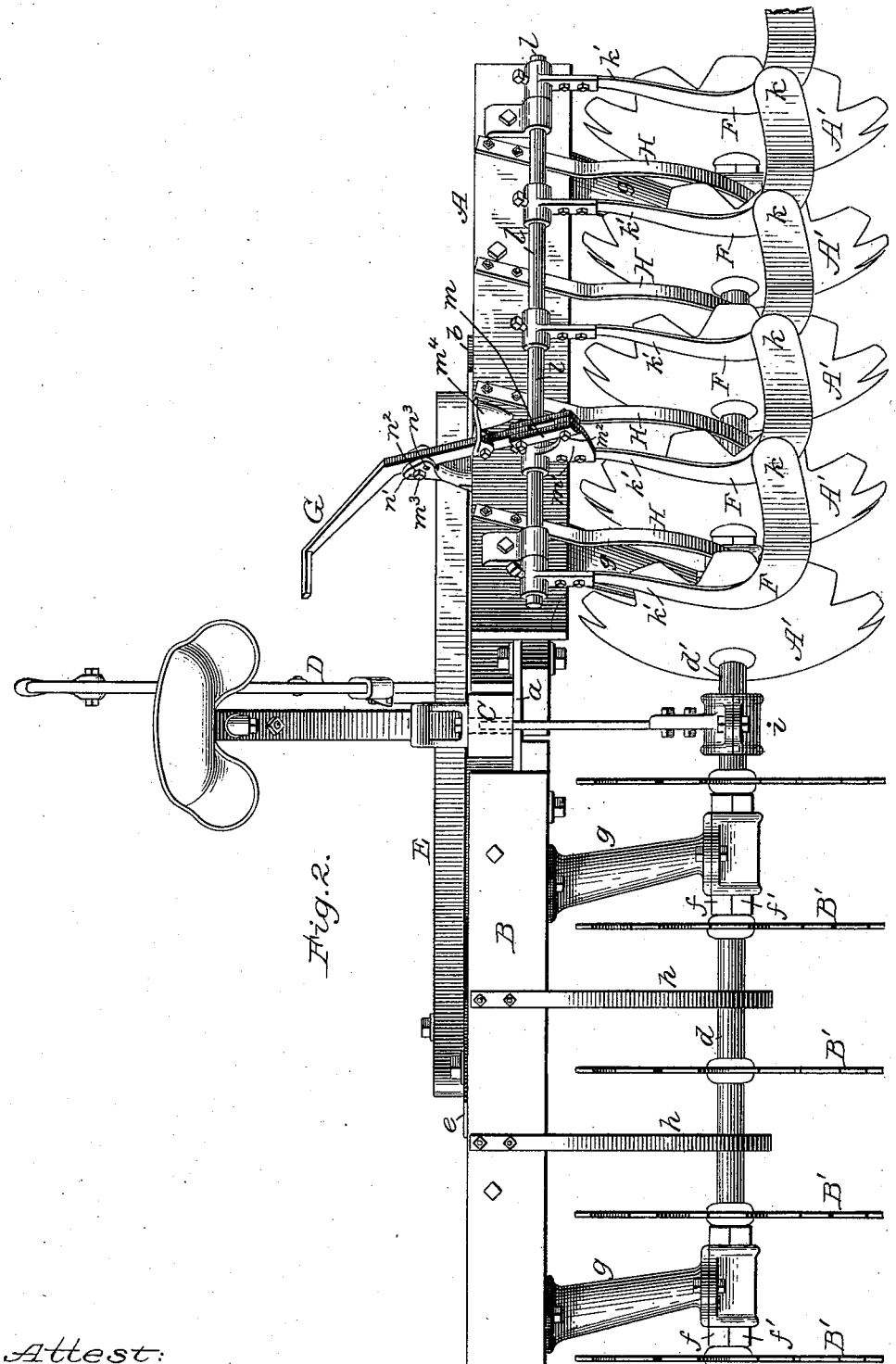
Figure 3:
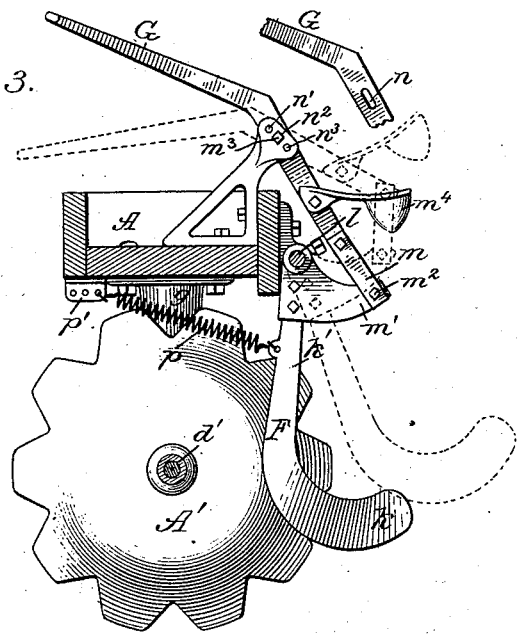
Figure 4:
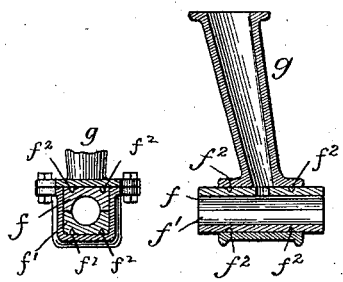
Figure 5:
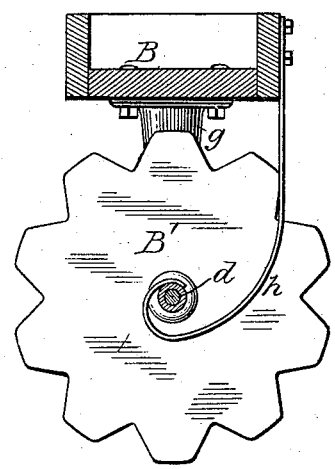

Referring to the drawings, Figure 1 illustrates one of my machines in plan view, without the driver's seat, and having a portion of the draft-pole broken away. Fig. 2 illustrates the machine in rear elevation. Fig. 3 is a sectional view illustrating in detail the mounting of the mold-boards and their controlling-lever. Fig. 4 is a longitudinal and a cross-section of an axle-hanger and its wooden journal-box. Fig. 5 is a sectional view showing one of the landside-disks and an adjacent clearer.

In this machine the gang-plow frame A, landside-frame B, and pole C, with coupling-plate $a$, connecting the frames to the pole, draft-links $b$ and $e$, the sliding yoke $c$, lever D, and intermediate mechanism for controlling the plow-frame A in its angular adjustment are all substantially as disclosed in my aforesaid application, Serial No. 414,487. In this machine, however, I have introduced a lateral spring-bar E, which centrally bears and is supported upon the upper side of the pole C, and is bolted at its ends, respectively, to the draft-links $e$ and $b$, the latter connection, as at $b'$, being variable because of a longitudinal slot in the spring-bar occupied by the bolt, the latter having a large washer, as shown, for securing good bearings at both sides of the slot. This spring-bar may be composed of either spring metal or suitable wood, and it maintains a desirable flexible bracing and supporting effect as against lateral strains and prevents the undue deflection of the outer ends of the two frames; and it also materially contributes to ease and effectiveness in operation while the plows are working over specially uneven ground.

The landsides B' in this machine are flat disks mounted on a suitable axle $d$, revolving in boxes $f f'$, clamped at the foot of hangers $g$, the latter being rigidly bolted at their tops to the under surface of the landside-frame B substantially as disclosed in my aforesaid application; but these boxes and the adjacent portions of the hanger involve a valuable improvement, as illustrated in Fig. 4. For simplifying these portions of the machine with resultant economy in construction and assembling, I have provided the upper and lower surfaces of the box-clamping portion of the hanger with integral spurs $f^2$, which readily puncture the backs of the two parts $f f'$ of the wooden box and securely lock the several parts together, thus avoiding the use of ribs and of special mortising of the boxes as heretofore while enabling these parts to be speedily and cheaply assembled. These landside-disks B' are toothed or bladed, as shown in Fig. 5, so as to secure good soil-puncturing or deep-cutting capacity without unduly reducing their area, it being understood that the latter must afford sufficient lateral contact with the soil to enable them to resist the lateral displacement which would otherwise result from the side thrust of the plowshares A'. Being thus bladed or toothed, the landside-disks are liable to pick up and carry roots and other trash and to wind or "ball up" the same on the axle $d$. The hangers between adjacent landside-disks effectually prevent the balling or winding of roots and weeds around the axle, and for securing the same results between the other landside-disks I have provided trash-clearers $h$, which are pendent strips of steel or iron bolted to the rear side of the landside-frame, and curve forwardly to and in contact with the axle $d$, to which they are preferably securely, but loosely, connected.

The rotary plowshares A' are substantially as in my prior machines, and their axle $d'$, with the appropriate hangers and boxes, are similar to those already described. The axles $d$ and $d'$ at their inner ends occupy an iron journal and thrust-box or ball-and-socket connection $i$, having a vertically-projected stem which loosely occupies a hole in the rear end of the pole, thus preventing the box or socket from rotating with the axles, as in my prior machines. The plowshares by means of the plow-frame and hand-lever D are adjustable with reference to the line of draft, and they are capable of cutting deeply into the soil and raising masses thereof edgewise, so that they may be turned over by their contact with the hinged and vertically-adjustable mold-boards F. Each plowshare has its own mold-board, and the working portion or blade $k$ of each mold-board is located at the rear of its appropriate share and extends laterally therefrom. The several mold-boards at the tops of their shanks $k'$ are connected with a rock-shaft $l$, provided with bearings secured to the rear side of the weight-box or plow-frame A, so that each thus-pendent mold-board has its shank lying near the back of its share and with the blade $k$ located normally at the usually-desired height above the bottom edge of the rotary share. The mold-boards are readily lifted and controlled as to vertical adjustment by means of a hand or a foot lever G, fulcrumed on the plow-frame and coupled by a link $m$ to a suitable segmental block $m'$ at the top of the shank of one of the mold-boards, so that by depressing the free end of the lever the mold-boards will be lifted.

As shown in Fig. 3, said link $m$ and the adjacent portion of the lever G occupy a straight line between the pivot-bolt $m^2$ on said segmental block $m'$ and the lever-fulcrum bolt $m^3$, and therefore with the foot-lever free the mold-boards are normally locked against upward or undue vibratory movement; or, in other words, they are held to the performance of their furrow-turning duty. For preventing the lever from vertical or free vibration its lower end carries a well-extended counterweight $m^4$, so that whenever the lever is not under manipulation it and its link are forced by said weight to automatically assume their locking or bracing positions with relation to the mold-boards. Of course the mold-boards, being usually of plate steel, are more or less flexible and resilient, and their combined weight causes them to naturally assume their lowest position, so that when locked for service as described they can temporarily yield or bend somewhat under severe service while turning furrows. I have, however, arranged for a bodily swinging capacity in the mold-boards by providing the lever G, adjacent to its fulcrum-bolt $m^3$ with a short longitudinal slot $n$. (Shown in a small detached view in Fig. 3.) The fulcrum-stand of the lever is provided with three pairs of holes $n' n^2 n^3$, the middle pair, as shown, being now occupied by the fulcrum-bolt $m^3$ and the latter being at the upper end of the slot $n$. Said lever is capable of a slight endwise movement responsive to pressure against the front faces of the mold-board blades. No such movement would be afforded if the fulcrum-bolt occupied the lower pair of holes, and with said bolt in the upper holes the mold-board would be raised and held above their normal position, because the slot $n$ is only as long as the distance between either two of the three fulcrum-points, thus providing for varying the location or height of the mold-boards with reference to the bottom of the furrows cut by the plow-shares.

While the normal flexibility of the plate-metal mold-board is always available after they have completed their full swinging movement, (permitted by the slot $n$,) it is of substantial consequence in working some soils, and especially with cast-metal mold-boards, that said swinging movement be also of a resilient character, and this I accomplish by providing one or more of the mold-boards, whether composed of cast metal or spring metal, with strong springs, which operate as yielding or resilient braces for holding the mold-boards in their normal positions. As shown in Fig. 3, a spiral spring $p$ extends from the front under side of the gang-frame to a mold-board shank $k'$, so that under ordinary working circumstances the mold-boards will maintain their lowest position; but the spring or springs will yield from time to time under variable strains on the mold-board, and if heavy springs be used they may sometimes be wholly depended upon for arresting the rearward movements of the mold-boards, as when the fulcrum-bolt of the foot-lever has been removed. The spring-base $p'$ is provided with several holes, either of which may be occupied by the end of the spring for varying its tensile capacity.

It will be obvious that the hinged mold-boards and the rotary plowshares may be employed regardless of variations in the character and arrangement of the landsides.

In this machine I employ scrapers H, which, as in some of my prior machines, are pendent from the weight-box, lie closely adjacent to the inner upper faces of the plowshares, and are so connected with the axle as to preclude the balling of soil and trash.

The number of rotary shares in any one machine may of course be varied without departure from my invention, it being only necessary to employ therewith an appropriate landside resistance for balancing the side thrust of the share or shares.

Having thus described my invention, I claim as new and desire to secure by Letters Patent—

1. The combination, substantially as hereinbefore described, of a rotary plowshare, a hinged mold-board having its blade at the rear of and extending laterally from the rear edge of the share, and a lever connected with said mold-board for vertically controlling its blade or working face.

2. The combination, substantially as hereinbefore described, of a gang of rotary plowshares, a corresponding number of connected hinged mold-boards, and a lever coupled therewith for vertically varying the position of all of the mold-boards.

3. The combination, substantially as hereinbefore described, of a rotary plowshare, a hinged mold-board, and a controlling-lever coupled to the mold-board by a link connection, which upon a release of the lever automatically locks the mold-board in its normal working position.

4. The combination of a rotary plowshare, a hinged mold-board, and a mold-board-controlling lever provided at its fulcrum with a variable bolt-and-slot connection, substantially as described, for enabling the adjustment of said lever in either rigidly confining the mold-board in its working position or permitting a limited upward and rearward movement of said board.

5. The combination, with a rotary plowshare, of a hinged or swinging mold-board held in its normal working position under yielding pressure, substantially as described.

6. The combination, with a gang of rotary plowshares, of a gang of rotary bladed or toothed landside-disks, and clearers located between the landside-disks and in contact with their axle, substantially as described, for freeing the landsides from roots and weeds and preventing them from being wound upon the axle.

7. The combination, in a plowing-machine, of a gang of rotary plowshares and a gang-frame, appropriate landside devices, and a landside-frame, a pole to which the inner ends of both of said frames are flexibly connected, draft links or bars, also coupling said frames to the pole, and a lateral spring-bar centrally bearing on the pole and pivoted at its ends to the two draft-bars, substantially as described.

8. The combination, in a disk-gang frame and with its axle, of wooden journal-boxes occupying the space between two adjacent disks, and hangers secured at their upper ends to the frame, and at the lower ends having box-clamps provided with integral spurs for puncturing the wooden boxes and securely locking the latter against endwise movement in the clamps, substantially as described.

GEORGE MARSHALL CLARK.

Witnesses:
ROBERT S. CRITTENDEN,
WELLINGTON H. WART.